US009742189B2

(12) United States Patent
Watanabe et al.

(10) Patent No.: US 9,742,189 B2
(45) Date of Patent: Aug. 22, 2017

(54) MICROGRID CONTROL SYSTEM

(75) Inventors: Tohru Watanabe, Tokyo (JP); Juichiro Atsumi, Tokyo (JP); Masahiro Sekoguchi, Tokyo (JP); Masanori Kaminaga, Tokyo (JP); Kosho Aikawa, Tokyo (JP); Hisayuki Magoroku, Tokyo (JP); Tomoharu Nakamura, Tokyo (JP); Yuichi Nagayama, Tokyo (JP); Shigeki Hirasawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 733 days.

(21) Appl. No.: 14/126,730

(22) PCT Filed: Jun. 17, 2011

(86) PCT No.: PCT/JP2011/003461
§ 371 (c)(1),
(2), (4) Date: Apr. 1, 2014

(87) PCT Pub. No.: WO2012/172616
PCT Pub. Date: Dec. 20, 2012

(65) Prior Publication Data
US 2014/0252855 A1   Sep. 11, 2014

(51) Int. Cl.
*G05D 3/12* (2006.01)
*H02J 3/00* (2006.01)
(Continued)

(52) U.S. Cl.
CPC ............ *H02J 3/00* (2013.01); *H02J 3/383* (2013.01); *H02J 3/46* (2013.01); *H02J 7/35* (2013.01);
(Continued)

(58) Field of Classification Search
CPC ............ G06Q 10/04; G06Q 10/0639; G06Q 10/06315; Y04S 10/54; H02J 2003/003;
(Continued)

(56) References Cited

U.S. PATENT DOCUMENTS

2003/0220720 A1* 11/2003 Shimode .............. H02J 3/008
700/296
2004/0257858 A1* 12/2004 Mansingh ............. G06Q 50/06
365/154
(Continued)

FOREIGN PATENT DOCUMENTS

JP   2002-044870 A   2/2002
JP   2006-050834 A   2/2006
(Continued)

OTHER PUBLICATIONS

Soder L: "Reserve Margin Planning in a Wind-Hydro-Thermal Power System", IEEE Transactions on Power Systems, IEEE Service Center, Piscataway, NJ, US, vol. 8, No. 2, May 1, 1993 (May 1, 1993), pp. 564-571, XP000384307, ISSN: 0885-8950, DOI: 10.1109/59.260826.

*Primary Examiner* — Darrin Dunn
(74) *Attorney, Agent, or Firm* — Volpe and Koenig, P.C.

(57) ABSTRACT

The present invention relates to a system for controlling microgrid facilities. In particular, the microgrid control system provided is capable of controlling multiple facilities according to characteristics of the facilities in order to achieve economic efficiency, environmental friendliness, and continued operability. The microgrid control system for controlling the operations of the multiple power facilities is provided with: a power supply activation/suspension planning unit that has a prediction unit for predicting outputs or loads of power supply facilities or load facilities and a prediction unit for predicting prediction errors contained therein; and an economical load allocation unit that determines command values related to the distribution of loads to be borne by currently running power supply facilities.

5 Claims, 11 Drawing Sheets

(51) Int. Cl.
  *H02J 3/46* (2006.01)
  *H02J 3/38* (2006.01)
  *H02J 7/35* (2006.01)
  *H02J 13/00* (2006.01)

(52) U.S. Cl.
  CPC ..... *H02J 13/0006* (2013.01); *H02J 2003/003* (2013.01); *Y02E 10/563* (2013.01); *Y02E 10/566* (2013.01); *Y02E 40/72* (2013.01); *Y04S 10/123* (2013.01); *Y10T 307/406* (2015.04)

(58) Field of Classification Search
  CPC ......... H02J 3/381; H02J 1/14; Y02B 70/3216; G05B 15/02; G05B 13/026; G05B 13/048; Y02P 90/20
  See application file for complete search history.

(56) References Cited

U.S. PATENT DOCUMENTS

| | | | | |
|---|---|---|---|---|
| 2005/0033481 A1* | 2/2005 | Budhraja | ................ | H02J 3/008 700/286 |
| 2005/0154499 A1* | 7/2005 | Aldridge | ................ | F02G 1/043 700/286 |
| 2006/0085363 A1* | 4/2006 | Cheng | ................ | F01K 13/02 705/400 |
| 2008/0154810 A1* | 6/2008 | Ye | ................ | G06N 3/12 706/13 |
| 2008/0297075 A1* | 12/2008 | Wright | ................ | B60L 11/02 318/146 |
| 2009/0062969 A1* | 3/2009 | Chandra | ................ | G06Q 10/06 700/291 |
| 2011/0035071 A1* | 2/2011 | Sun | ................ | H02J 3/00 700/291 |
| 2011/0071693 A1* | 3/2011 | Sun | ................ | G06F 17/30557 700/291 |
| 2011/0231028 A1* | 9/2011 | Ozog | ................ | G06Q 10/06 700/291 |
| 2012/0054139 A1* | 3/2012 | Nikovski | ................ | G05B 13/024 706/46 |
| 2012/0065792 A1* | 3/2012 | Yonezawa | ................ | H02J 3/14 700/291 |
| 2012/0271470 A1* | 10/2012 | Flynn | ................ | H02J 3/383 700/292 |
| 2012/0310608 A1* | 12/2012 | Nikovski | ................ | G05B 19/00 703/2 |

FOREIGN PATENT DOCUMENTS

| | | |
|---|---|---|
| JP | 2006-304402 A | 11/2006 |
| JP | 2008-054385 A | 3/2008 |
| JP | 2011-050133 A | 3/2011 |
| JP | 2011-114900 A | 6/2011 |

* cited by examiner

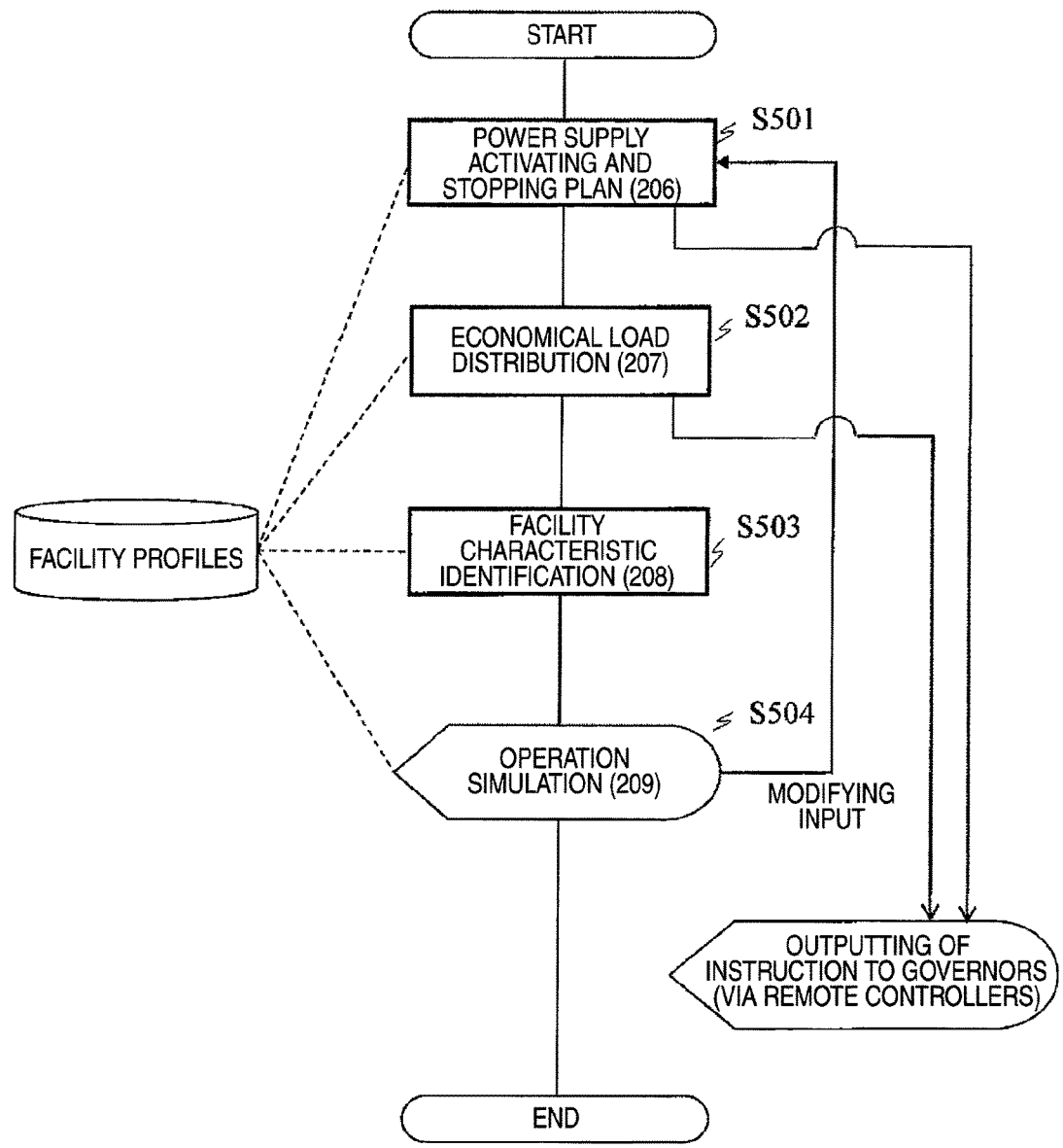

FIG.6

| FACILITY PROFILES |
|---|

+deviceType = "DEG"
+manufacturerType = "manufacturer name"
+model = "DEG1000kVA400V"
+version= "1.0"
+properties= {

<cim:Genset rdf:ID="DEG21">
      < cim:Naming.name > name dictionary of embodiment 1< /cim:Naming.name >
      < cim.Equipment.MemberOf._EquipmentContainer rdf:resource="transformer 141">
      <cim:VoltageLevel.BaseVoltage>400</cim:VoltageLevel.BaseVoltage>
    </cim:Genset>
    < cim:Location rdf:ID="Configuration FIG. 1">
      <cim.Location.PowerSystemResource rdf:resource="transformer141secondary side wire">
    </cim:Location>
    <cim:GmlPosition rdf:ID="CP1005">
      <cim:GmlPosition.X coordinate>187635</cim:GmlPosition.X coordinate>
      <cim:GmlPosition.Y coordinate>772863</cim:GmlPosition.Y coordinate>
    </cim:GmlPosition>

<cim:PowerLevel.Rated Output>1000kVA</cim:PowerLevel.Rated Output>
    <cim:PowerLevel.Maximum Output>1100kVA</cim:PowerLevel.Maximum Output>
    <cim:PowerLevel.Minimum Output>100kVA</cim:PowerLevel.Minimum Output> function>     <cim:Fuel consumption function>F(x)=0.0001x*x+0.01x+10</cim:Fuel consumption <cim:gen.Fuel Increment $\lambda$>0.0001*x+0.01</cim.Fuel Increment $\lambda$>

<cim:Environment-Friendly Operation Constraints>
      <cim:Long-Term Lightly Loaded Operation Lower Limit Output >400kVA</cim:Output Permitting Long-Term Lightly Loaded Operation>
      <cim:Time for which Long-Term Lightly Loaded Operation is possible>120min</cim:Time for which Long-Term Lightly Loaded Operation is possible>
    </cim:Environment-Friendly Operation Constraints>

<cim: Response Transfer Function Order> 1</cim:Response Transfer Function Order>
    <cim: Response Time Constant>0.05</cim:Response Time Constant>
    <cim:Response Dead Time Constant>0.01</cim:Response Dead Time Constant>

}

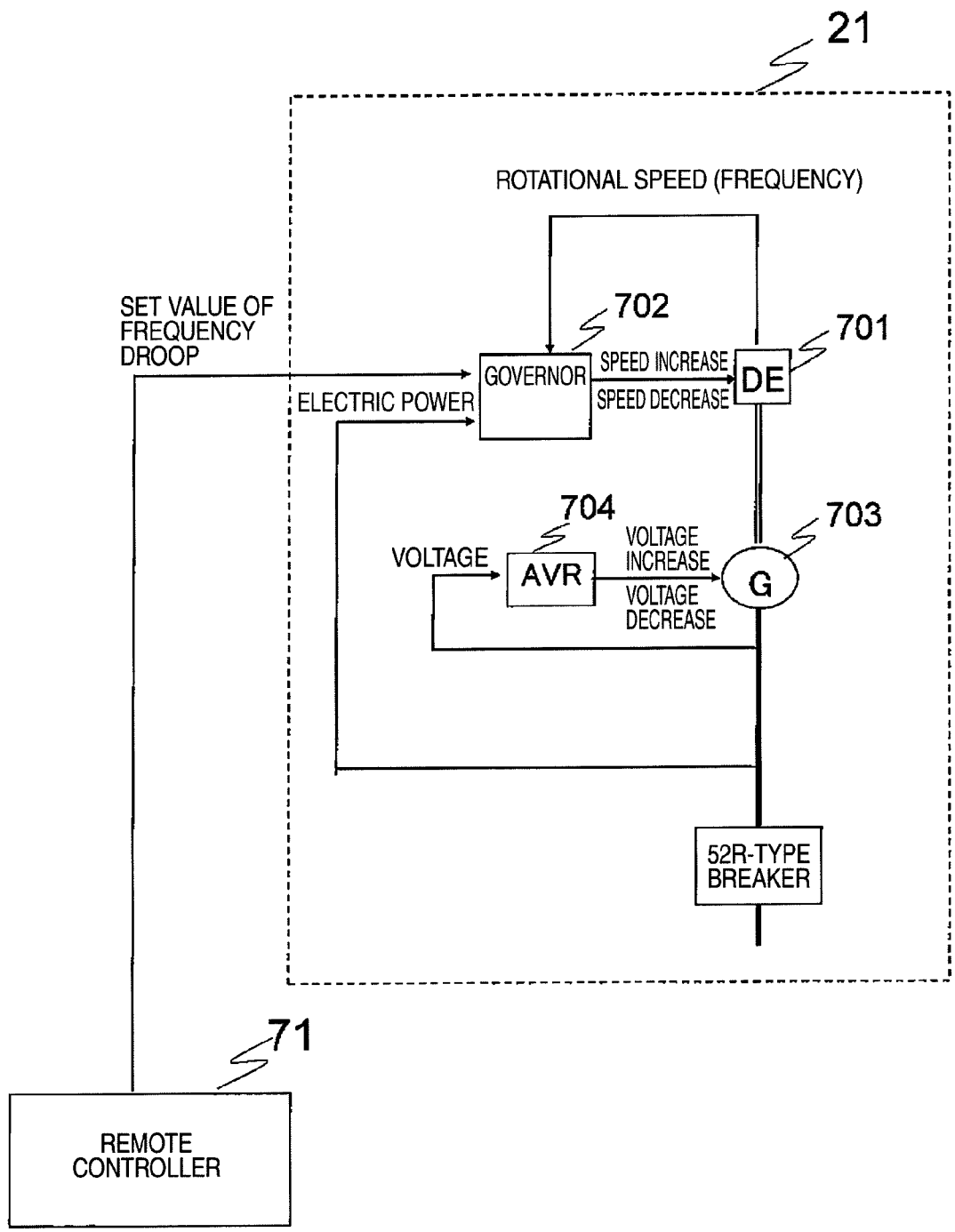

MICROGRID CONTROL SYSTEM

TECHNICAL FIELD

The present invention relates to a control system for microgrid equipment and, more particularly, to a microgrid control system for controlling equipment according to plural equipment characteristics and achieving control that realizes economy, environment-friendliness, and continued operability.

BACKGROUND ART

It has become important that various types of electric power equipment be interconnected with microgrids (small-scale electric power systems) and used. However, in order that power supply equipment utilizing natural energies such as solar generators and wind power generators be interconnected and used, it is necessary to perform such control that the total electric power obtained by adding output power generated by natural energies to output powers of other power supply equipment such as diesel generators (hereinafter referred to as DEGs), gas turbine generators, and storage batteries is coincident with the total amount of load obtained by summing up the demands of the supply destinations (i.e., the amounts of load on power generators). Therefore, the output of power generators is conversely increased in conformity either with a decrease in the output of natural energies or with a load increase or decrease.

In order to increase the output of power generators in preparation for decreases in output of natural energies or sudden increases in load in this way, it is necessary to previously activate power generators. However, if the number of operating power generators is increased, fuel for idling operation of the power generators is needed. This impairs the economy. Furthermore, if power generators such as DEGs are run at low loads while throttling down their outputs over long times, the combustion temperature of fuel within the engines drops. Combustion residue components of fuel (components causing black smoke of gas emissions) are accumulated, thus deteriorating the environment-friendliness. Accordingly, such control must be performed that an appropriate number of power generators are run and the total output power generated is brought into coincidence with the total demand while stopping other power generators. Such control is called microgrid control.

In the technique set forth in patent literature 1, control is provided such that the total electric output generated is brought into coincidence with the total electric power demand by shortening the periods of outputs of natural energies and the periods of forecasting of load so as to perform accurate forecasts while stopping unnecessary power generators.

Electric power equipment referred to herein includes solar power generators, wind power generators, diesel generators, gas turbine power generators, brackish water desalination power generators, other power generators, production facilities equipped with power generators employing electric power as motive power (such as refrigerators and push benches), electric vehicles, charging facilities for electric vehicles, and storage batteries for performing charging and discharging with electric power. Unless otherwise specifically stated, power supply facilities indicate the above-described power generators and secondary batteries such as storage batteries. Load facilities indicate the above-described production facilities and charging facilities.

CITATION LIST

Patent Literature

Patent Literature 1: JP-A-2002-44870

SUMMARY OF INVENTION

Technical Problem

However, the technique set forth in patent literature 1 provides control relying on forecasting of output of natural energies and loads. However, in a small-sized microgrid having a small number of electric power facilities interconnected with a system, a so-called law of great numbers permitting forecasts to hold does not hold and it is impossible to forecast the total amount of load at each instant of time and the amount of natural energy generated. Therefore, when the actual amount of load is greater than forecast, there is the problem that the supply capacity of power generation is insufficient. Furthermore, when the actual amount of load is smaller than forecast, the number of operating power generators is excessive, presenting the problem that the economy is impaired.

It is an object of the present invention to provide a microgrid control system which achieves economy without relying on the number of electric power facilities interconnected with a system if natural energy power generation is introduced.

Solution to Problem

In order to solve the foregoing problem, in a microgrid control system associated with the present invention, with respect to the amount of supply of power supply facilities and the amounts of load on load facilities, forecasts are first made including instantaneous variations (fringe) based on past actual values. According to forecast information and output characteristics of the power supply facilities, a combination that makes the whole system have an appropriate economical efficiency is extracted from among the plurality of power supply facilities. Instructions are given to the extracted power supply facilities to adjust their output or activate themselves.

Advantageous Effects of Invention

According to the method of the present invention, it is possible to build a microgrid control system which achieves economies without relying on the number of electric power facilities interconnected with a system if natural energy power generation is introduced.

BRIEF DESCRIPTION OF DRAWINGS

FIG. 5 is a flowchart illustrating processing of microgrid control.

FIG. 6 is a diagram illustrating equipment profiles.

FIG. 7 is a diagram of the hardware configuration of DEG facilities.

DESCRIPTION OF EMBODIMENTS

The present embodiment is hereinafter described with reference to the drawings.

Figure 1:
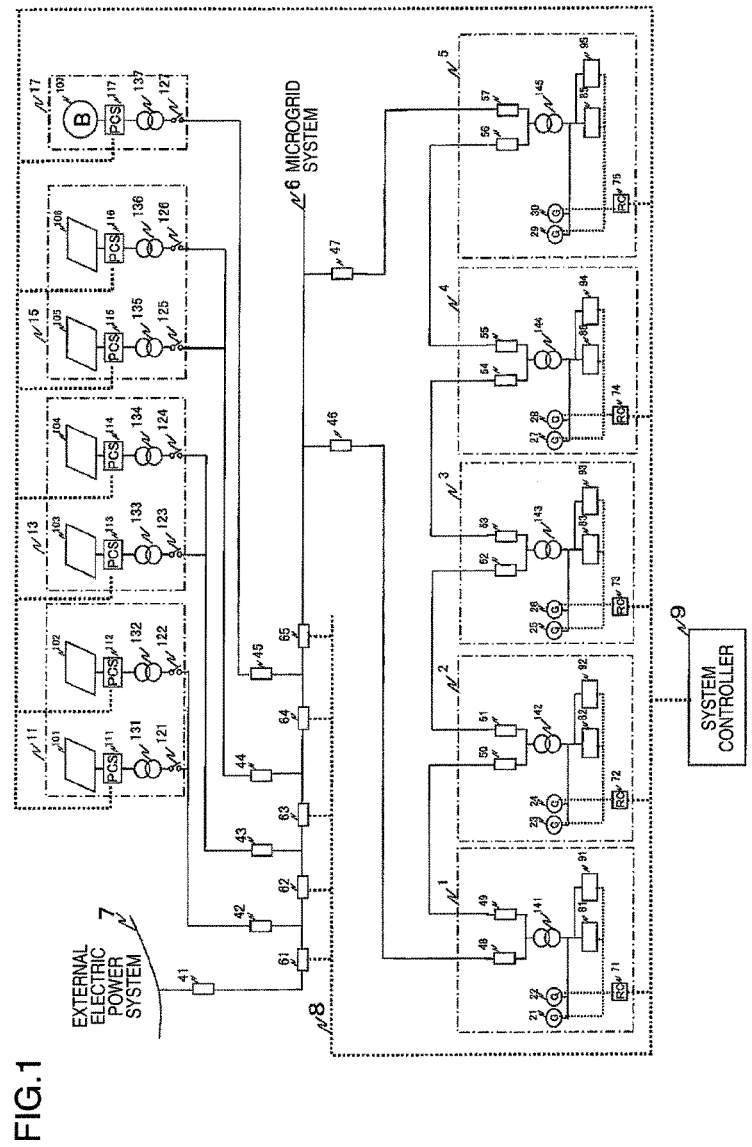
FIG. 1 is a diagram of the hardware configuration of a microgrid.

FIG. 1 is a diagram showing the hardware configuration of a microgrid control system associated with the present embodiment. This configuration is a system built by electrical connection of in-plant systems, power supply facilities, load facilities, and shared power supply facilities within plural plants and by information communication connections. Plants 1-5 receive supply of electric power from a microgrid system 6.

The microgrid system 6 is interconnected to an external electric power system 7 (e.g., electric power transmission lines of an electric power company; reference voltage is 30 kV). The shared power supply facilities 11-17 supply electric power. Breakers 41-65 are installed in power feeder lines (electric power lines constituting the microgrid system and in-plant electric power lines). Connection and disconnection between an external system and the microgrid system can be controlled by opening and closing especially 61-64 by means of information communications. Furthermore, when the external system and the microgrid system are disconnected, it is possible to control whether the shared power supply facilities 11-17 are connected with the external system or with the microgrid system. Each of the plants 1-5 is equipped with power supply facilities 21-30, load facilities 81-85, and 91-95. They are connected by power transmission lines having a reference voltage of 400 V, and form parts of the microgrid system. Transformers 141-145 are installed between electric power transmission lines (reference voltage of 30 kV) interconnecting the plants and in-plant electric power transmission lines on the premises of the plants to transform voltages into the reference voltage. Solar photovoltaic panels 101-106 and batteries 107 are incorporated within the shared power supply facilities 11-17 and supply DC power. Power conditioners (PCSes) 111-117 convert the DC power into AC power of a reference voltage of 400 V and output it. In addition, the power conditioners perform electrical processing for suppression of output in an emergency and for synchronization of frequency (phase control). The voltage is transformed from the reference voltage of 400 V to another reference voltage of 30 kV by transformers 131-137. Connection is made to the microgrid system via breakers 121-127 (normally open).

These power supply facilities and load facilities are connected with an information communication network 8. Information about the state of activation, state of operation, state whether open or closed, state of generation of electric power, state of storage of electric power, or the like is sent to a system controller 9. Control information is received from the system controller 9.

The system controller 9 receives information from the power supply facilities (the load facilities and power supply facilities) via the information communication network 8, performs computational processing regarding operation of the electric power facilities, and sends control information to the electric power facilities. Various types of information (such as control information) are sent and received among the power supply facilities, load facilities, and system controller by employing remote controllers 71-75. One example of the remote controller is a wireless LAN. Functions can be allotted to the remote controllers and the system controller 9. Governors (not shown) are incorporated in the power supply facilities to control mechanical operation based on the control information.

Figure 2:
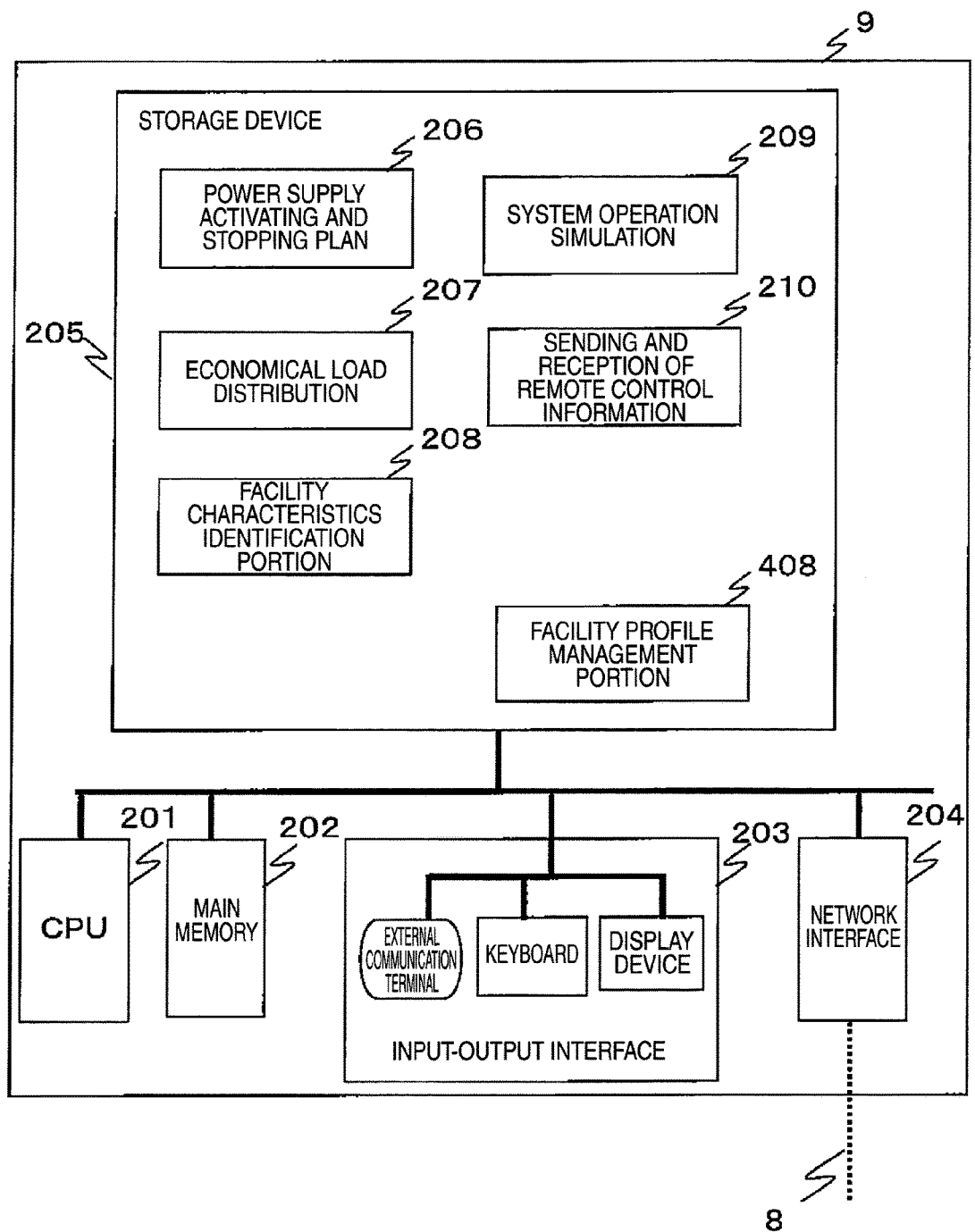
FIG. 2 is a diagram of the hardware configuration of a system controller.

FIG. 2 is a diagram showing the hardware configuration of the system controller 9. The system controller 9 is composed of a CPU 201, a main memory 202, an input-output interface 203, a network interface 204, and a storage device 205. These are connected by a bus or the like.

The network interface 204 is connected with the information communication network 8, and has a function of sending and receiving information to and from the remote controllers 71-75.

The storage device 205 is composed of a HDD or the like and loaded with programs for realizing the functions of a power supply activating and stopping plan 206, an economical load distribution 207, a facility characteristics identification 208, an operation simulation 209, and remote control information sending and reception 210.

The CPU 10 realizes the various functions by performing processing for reading the aforementioned programs from the storage device 205 into the main memory 202 and running the programs. The aforementioned functions may be implemented in hardware. Furthermore, the programs for realizing the functions may be shifted from a storage medium such as a CD-ROM or downloaded from other device via a network.

Figure 3:
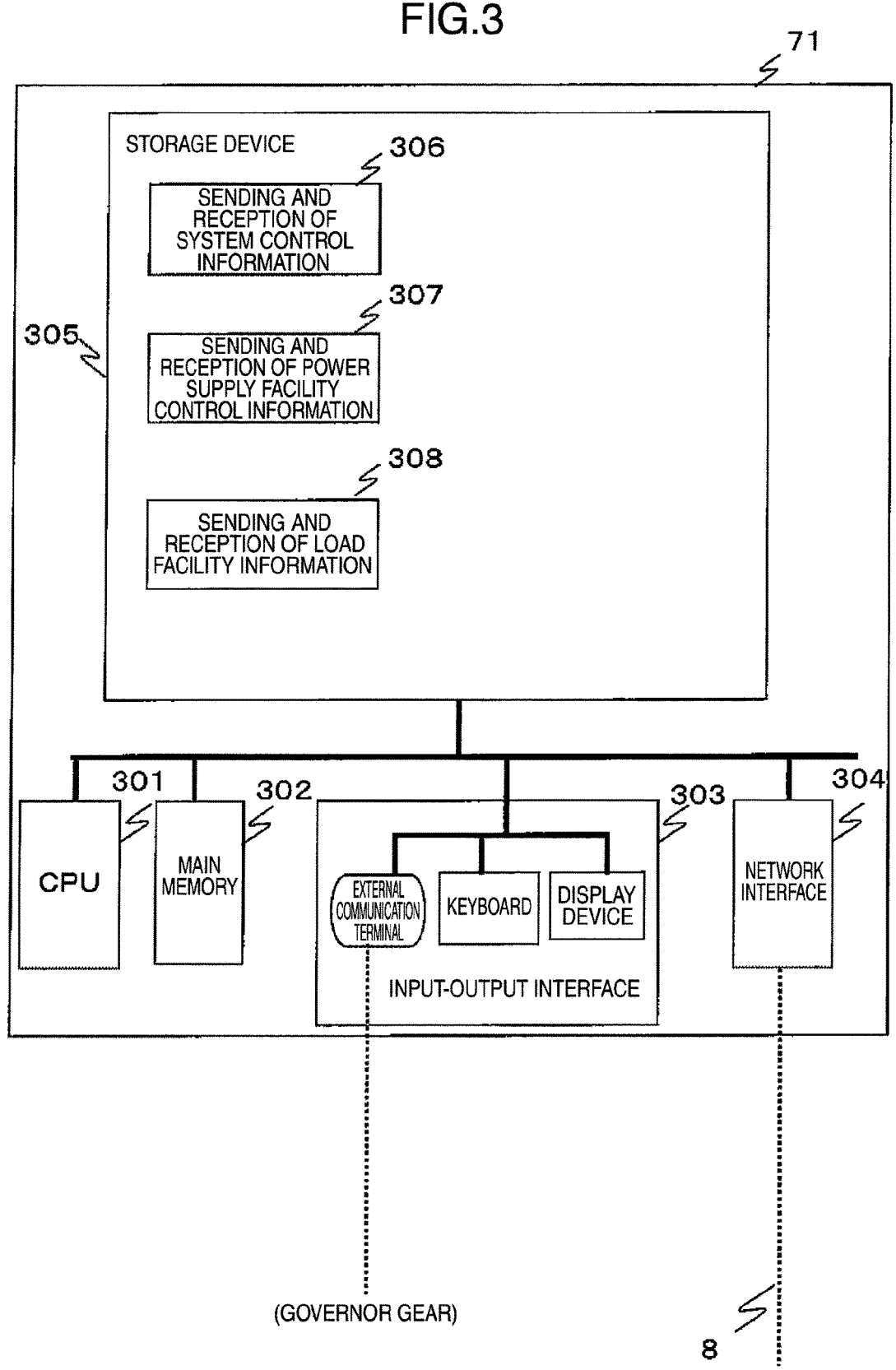
FIG. 3 is a diagram of the hardware configuration of a remote controller.

FIG. 3 is a diagram showing the hardware configurations of the remote controllers 71-75. These are identical in configuration, and 71 is shown as a representative. The remote controller 71 is composed of a CPU 301, a main memory 302, an input-output interface 303, a network interface 304, and a storage device 305. These are connected by a bus or the like.

The input-output interface 303 has functions of sending and receiving control information to and from the power supply facilities and of sending and receiving information to and from the load facilities. The network interface 304 is connected with the information communication network 8, and has a function of sending and receiving information to and from the system controller 9.

The storage device 305 is made of a HDD or the like and loaded with programs for realizing the functions of system control information sending and reception 306, power supply facility control information sending and reception 307, and load facility information sending and reception 308.

The CPU 10 realizes the various functions by performing processing for reading the aforementioned programs from the storage device 305 into the main memory 302 and running the programs. The foregoing functions may be implemented in hardware. Furthermore, the programs for realizing the functions may be shifted from a storage medium such as a CD-ROM or downloaded from other device via a network.

FIG. 5 is a flowchart illustrating a summary of the processing of the microgrid control system and ancillary processing.

In this system, the power supply activating and stopping plan 206 for drafting a plan of selecting DEG machines to select a number of DEGs of high power generation efficiencies which are necessary to supply electric power to the load is first performed (S501). Then, processing of the economical load distribution 207 for determining economical output distribution from the fuel consumption characteristics of the DEGs determined by the power supply activating and stopping plan 206 is performed (S502). Processing of the facility characteristics identification for sequentially updating the contents of the data from the operation data about the microgrid is performed (S503). Subsequently, simulation processing for effecting various operation simulations and displaying the results on input-output means is performed (S504).

Figure 4:
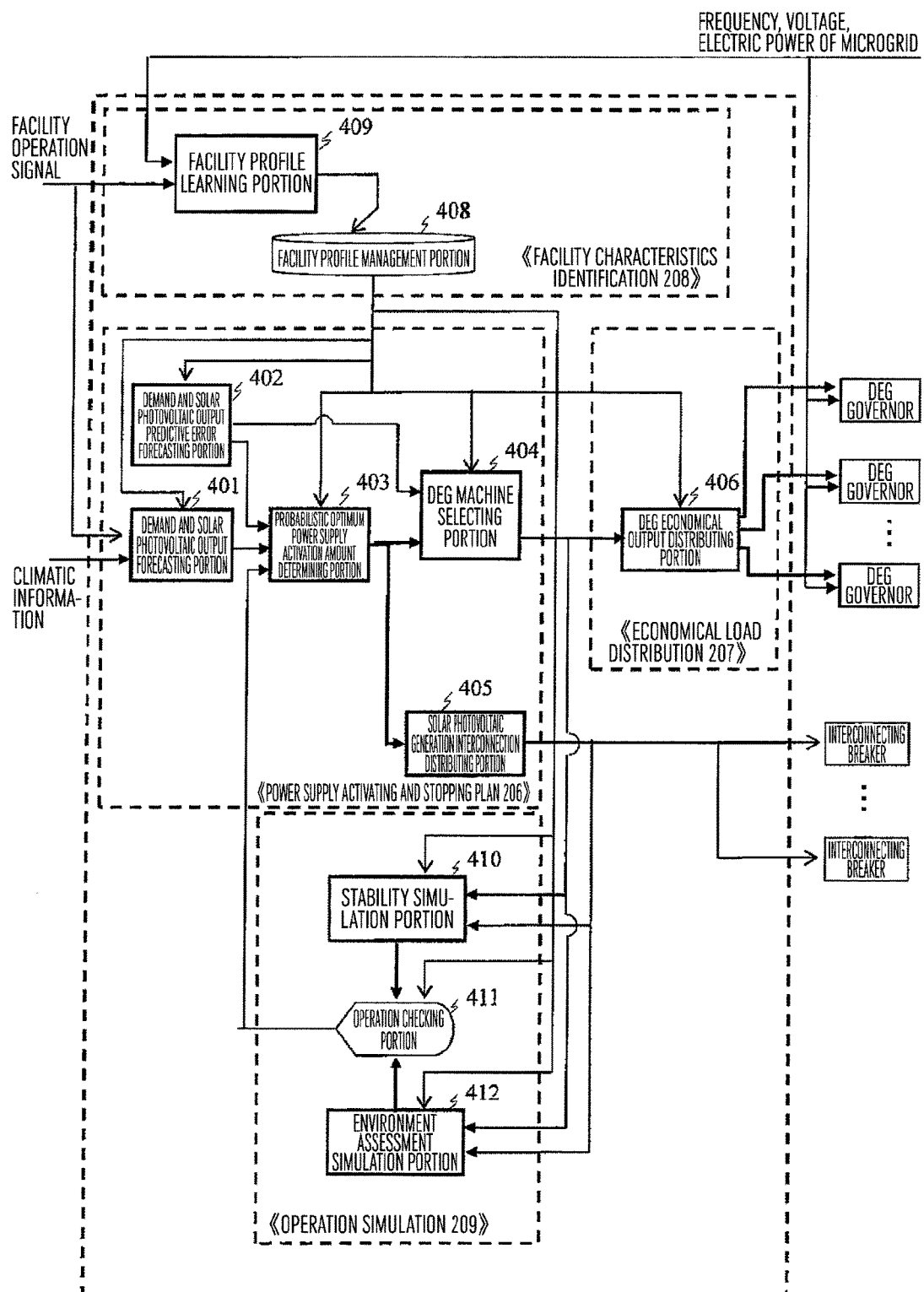
FIG. 4 is a functional block diagram of a microgrid control system.

Details of the steps described in connection with FIG. 5 are described using the functional blocks of FIG. 4 about the microgrid control system.

The system is composed of the blocks of the power supply activating and stopping plan 206, economical load distribution 207, facility characteristics identification 208, and operation simulation 209. The blocks have the following functional configurations. The blocks correspond to the various programs stored in the storage device 205 described in connection with FIG. 2.

The block of the power supply activating and stopping plan 206 consists of a demand and solar photovoltaic output forecasting portion 401, a demand and solar photovoltaic output predictive error forecasting portion 402 for forecasting generation of errors of forecasting of the demand made by the load facilities and errors of forecasting of the output from the solar power generators, a probabilistic optimum power supply activation amount determining portion 403 for determining the amount of activation of the DEGs for causing the microgrid to perform an interconnected operation (parallel operation) and the amount of the operation of the solar power generation facilities interconnected to the microgrid (this amount of activation of DEGs is a target value of the total of the rated outputs of the DEGs to be activated) from the forecast values of the demand and solar photovoltaic output and the forecast values of their forecast errors, a DEG machine selecting portion 404, and a solar photovoltaic generation interconnection distributing portion 405.

In this block, a plan for selecting a number of DEGs which are necessary to supply electric power to the loads and which have good power generation efficiencies and for activating them is drafted. In planning the selection of the DEG machines, it is desired to previously take account of the (daily) amount of load and the amount of electric power generated by solar light during one day in order to suppress deterioration of exhaust gas caused by partially loaded operation of the DEGs and deterioration of the economy due to frequent interruptions of operation. Accordingly, in the present block, DEG machines are selected after determining the total amount of activated DEG power supplies from the reference values about the demand and solar power output and from fringe values calculated from them. Details thereof are hereinafter described.

The demand and solar photovoltaic output forecasting portion 401 forecasts reference values of the demand and solar photovoltaic output (daily, long-term varying components) from a daily reference value of assumed load (forecasted from the rated electric powers of the load facilities and from data about past results of operations of the load facilities in separate days of the week such as average load factors) and from a daily reference value of solar photovoltaic output (forecasted from theoretical data about the amount of solar incidence, from data about forecasted weathers, and from data about power generation efficiencies).

Preferably, time-sequential data that is a reference value of the demand of electric power during a planned period within the microgrid is first forecasted as forecasted demand of electric power from information about actual results of the operation of the load facilities 81-85 and 91-95. Especially preferably, a time series $\{D(t)\}$ of a reference value (e.g., average value) of the total amount of demand is forecasted by obtaining information about a schedule from a plan of operation of the load facilities (corresponding to a so-called production plan execution system function) and adding up the average values of electric powers actually used in the past of the operated load facilities which are scheduled to be operated.

Then, as a forecast of solar photovoltaic output, the reference value of the electric power generated by each of the solar photovoltaic panels 101-106 during a planned period is forecasted. The forecasts are made from the capability value $PV\eta(i)$ of the solar panels for converting sunlight into electrical energy (where i the serial number given to each of the solar photovoltaic panels 101-106; information about each $PV\eta(i)$ is determined by making an amendment to the reference value of the recording in a facility profile management portion 408 considering variations in characteristics such as air temperature) and from forecasts of the amount of solar radiation. Here, the maximum value of the amount of solar radiation on the solar photovoltaic panels is mathematical formula (1).

$$\sin(h(t)) = \sin\phi \sin\delta + \cos\phi \cos\delta \cos\omega(t) \quad \text{(mathematical formula 1)}$$

where h is the solar altitude, $\phi$ is the longitude, $\delta$ is the declination of the sun, and $\omega(t)$ is the hour angle. Note that mathematical formula 1 indicates the amount of direct solar radiation. In addition to this, when the solar photovoltaic panels are installed at an angle or a large amount of reflected light reaches, a number giving either an amount of solar radiation at a tilted surface or the amount of global solar radiation may be used instead of mathematical formula 1.

The output from the solar photovoltaic panels is forecasted by multiplying the above-described amount of solar radiation (sin (h (t)) by a transmission solar radiation factor C that is a conversion factor for the amount of solar radiation actually reaching the solar photovoltaic panels through clouds or the like. That is, a time series $\{PV(t)\}$ of the solar photovoltaic output is calculated from mathematical formulas 2 and 3.

$$PV\_i(t) = PV\eta(i) \times C \times \sin(h(t)) \quad \text{(mathematical formula 2)}$$

(electric output (in kW) generated by each panel)

$$PV(t) = \Sigma_{i \in \text{interconnected photovoltaic panel No. set}} J(PV\_i(t)) \quad \text{[mathematical formula 3]}$$

(total output generated, in kW)

The transmission solar radiation factor C is held as a statistical value in calendar days of the year in the facility profile management portion 408. Furthermore, the transmission solar radiation factor C may be corrected by using a value obtained by multiplying either an image derived from an external camera looking at airy clouds or data about the thicknesses of clouds derived using a radar by a given coefficient. A time series of $\{D(t)-PV(t)\}$ that is a reference value of the amount of electric power that the DEGs must supply is calculated from the $\{D(t)\}$ and $\{PV(t)\}$ computed in this way.

For example, the planned period is assumed to be 24 hours from the present instant of time. The amount of demanded electric power and the amount of electric power produced by solar photovoltaic generation can be forecasted as time series of increments of 30 minutes. The present invention is not restricted to this example. For instance, the planned period may be set in conformity with time constraints on connection and disconnection of a system of power supply facilities such as solar photovoltaic generators (e.g., when a manipulation for connection or disconnection is allowed only once in 48 hours, the planned period is set to 48 hours).

The demand and solar photovoltaic output predictive error forecasting portion 402 makes forecasts regarding generation of errors concerning the demand, i.e., daily assumed load reference value, the daily reference value of the output produced by solar photovoltaic generation, and errors (mainly, short-term varying components (fringe components) deviating from the demanded amount of electric power that is a forecasted reference value and from long-term varying components of the amount of output produced by solar photovoltaic generation) of each instantaneously demanded amount of electric power and the amount of output produced by solar photovoltaic generation relative to their respective reference values or the total value of both reference values. Here, statistically generated tendency data which are likely to generate fringe occurrence frequencies and reproducibility of its magnitude are calculated as data associated with forecasting of generation of errors of forecasts. In performing statistical processing, the planned period is divided into given periods of consideration (in the aforementioned example, the planned period is taken to be 24 hours from the present instant of time; time zones each of 30 minutes are taken as the periods of consideration). For the sake of simplicity, one period of consideration starting at time t is denoted as period of consideration t. For example, when each individual period of consideration persists for 30 minutes, the period of consideration from time t to time (t+30 minutes) is denoted as period of consideration t, for the sake of simplicity.

Preferably, first regarding demanded electric power, processing for calculating a maximum magnitude of increase in demanded electric power due to activation of the load facilities 81-85 and 91-95 $\{\Delta Dup\ (t)\}$, average and dispersion $\sigma\_Dup\_count$ of the number of activations of the load facilities, a maximum magnitude of decrease of the demanded electric power $\{\Delta Ddown\ (t)\}$ due to stoppage of the load facilities, and average and dispersion of the number of stops in time zones of periods of consideration on the same week days or same calendar days in the past to which the planned period corresponds is performed.

Where the system controller has means for directly measuring events of activation or deactivation of the loading facilities, the system controller records activating and deactivating events, thus realizing this processing. Where the system controller fails to have any means for directly measuring activating or deactivating events of the load facilities, the processing may be carried out by regarding a rapid increase in the load curve of the total demanded amount of electric power as an event for activating load facilities and regarding a rapid decrease of the load curve as an event for deactivating load facilities.

Regarding the solar photovoltaic output, in the time zones of periods of consideration on the past same calendar days to which the planned period corresponds (preferably, past days having the same solar altitude when leap years are taken into account), a maximum magnitude $\{\Delta PVdown\ (t)\}$ of decreases of short-term drops (instantaneous drops) of the solar photovoltaic output of variations of photovoltaic outputs from the solar photovoltaic panels 101-106 and the average $E\_PVdown\_count$ of the number of the generated drops and dispersion $\sigma\_PVdown\_count$ are calculated. Furthermore, a maximum magnitude $\{\Delta PVup\ (t)\}$ of increases of short-term increases of solar photovoltaic output of variations of the photovoltaic output and the average $E\_PVup\_count$ of the number of the generated increases and dispersion $\sigma\_PVup\_count$ are calculated.

In this embodiment, the system controller records and holds data obtained by measuring the solar photovoltaic output. Based on the past data, the above-described values are calculated. Besides the embodiment, the difference between the value of mathematical formulas 2 and 3 in which the transmission solar radiation factor C is set to a theoretical maximum value of 1.0 or the like and the forecasted reference value $\{PV\ (t)\}$ of the aforementioned solar photovoltaic output may be set to $\{\Delta PVup\ (t)\}$. In this case, execution from the beginning of introduction of the system at which past data are not stored is possible.

Instead of the above-described processing, the demand and solar photovoltaic output predictive error forecasting portion 402 may calculate the number of airy clouds, the widths of the clouds, the thicknesses of the clouds, and the speeds at which the clouds are moving, estimate variations of the transmission solar radiation coefficient C, and calculate $\{\Delta PVdown\ (t)\}$, $E\_PVdown\_count$, dispersion $\sigma\_PVdown\_count$, $\{\Delta PVup\ (t)\}$, $E\_PVup\_count$, and dispersion $\sigma\_PVup\_count$ from current data obtained from an external camera observing airy clouds or a radar or from past data about these.

The forecasting of predictive errors of demand and solar photovoltaic output as described so far, i.e., to precisely forecast when fringes will be produced, is equivalent to forecasting when the load facilities will be operated or come to a stop or forecast at what instant of time the incident solar radiation will increase or decrease and thus difficult to achieve. However, statistical generation tendency data are easy to calculate. Note that the present invention is not restricted to this embodiment. Instead, fringes may be forecasted nonstatistically from a schedule of control of the operation of electric power facilities or by direct observation of daily climatic phenomena. Especially, from nighttime to morning where the total amount of electric power demanded by all manufacturing plants is low, i.e., in a time zone where large-scale load facilities are activated, the remote controllers 71-75 may accept reservations for activation of load facilities. Consequently, the system controller 9 can more accurately forecast short-term variations $\{Dup\ (t)\}$ of the amount of electric power demanded.

The probabilistic optimum power supply activation amount determining portion 403 performs the following processing to determine a target value of the total of the rated outputs of activated DEGs and the amount of interconnection of solar photovoltaic panels interconnected with the microgrid.

The amount of electrical output $Pdeg\ (t)$ [kW] that each DEG should bear in each period of consideration t is calculated as given by mathematical formula 4, based on $\{D\ (t)\}$ and $\{PV\ (t)\}$ which is information about the electric power demanded in each period of consideration t and the solar photovoltaic power which has been found in the block 401, on a maximum magnitude $\{\Delta Dup\ (t)\}$ of the incremental amount of electric power for short-term demand, and on a maximum magnitude {ΔPDdown (t)} of the short-term decremental amount of the solar photovoltaic output.

$$P\deg(t)=\{D(t)-PV(t)\}+\{\Delta PV\text{down}(t)+\Delta D\text{up}(t)\}\times M\text{up\_E\_}\sigma \quad \text{(mathematical formula 4)}$$

Here, to cope with an increase in the requested burden share of the DEG output due to fringes, a spare amount of output (instantaneous reserve capability) of the DEG is secured. Specifically, the spare amount of output is secured by multiplying [ΔPVdown (t)+ΔDup (t)] by a safety factor (Mup_E_σ). Normally, this safety factor is set to a value of 1.0 or higher. Preferably, where a function of a distribution of the number of occurrences of drops of the solar photovoltaic output has wide tails, i.e., where the value of σ_PVdown_count is large, Mup_E_σ is set to a large value. For this purpose, a comparison table between σ_PVdown_count and Mup_E_σ may be created. Furthermore, where σ_Dup_count is large, Mup_E_σ may be set to a large value, and a comparison table for them may be built. Where processing in which a comparison table is previously created in this way and Pdeg (t) is calculated is performed, information about Mup_E_σ may be extracted from this comparison table and computational processing may be performed. According to this method, when the comparison table is created, the lower limit of Mup_E_σ for securing a reserve amount of output necessary to avoid voltage drops of the microgrid system and frequency decreases due to a lack of the DEG output can be previously optimized by a test environment or a computer simulation.

In addition to the present embodiment, in a case where the dispersion σ_δ(t) (the dispersion value of the set {Dup_i} of Dup_i of the sizes of fringes due to either activation of load facilities during period t or a decrease in the solar photovoltaic output is denoted as σ_δ(t)) of sizes of fringes produced in periods) is large, Mup_E_σ may be increased. In this case, if the probability of the scale of fringe decreases is uncertain in addition to the probability of generation of fringes, the DEGs can be run well.

The amount by which the solar photovoltaic panels are interconnected to the microgrid is determined (determination of the set J of the panel numbers interconnected with the microgrid) as follows.

An instantaneously reducible amount of DEG output which is identical to or greater than a maximum amount of "increase in the solar photovoltaic output+decrease in the electrical load on plants" during a period of consideration is made obtainable. Therefore, the minimum output of the DEGs needs to satisfy mathematical formula 5.

$$P\deg(t)\geq\{\Delta PV\text{up}(t)+\Delta D\text{down}(t)\}\times M\text{down\_E\_}\sigma \quad \text{(mathematical formula 5)}$$

where Mdown_E_σ within mathematical formula 5 is a safety factor regarding securing of an amount by which the DEG output can be reduced (instantaneously suppressed capability) in response to a decrease in the required burden share of DEG output due to fringe. Usually, the factor is set to a value of 1.0 or higher. When σ_δdown (t) is greater than the dispersion value of a set {Ddown_i} of Ddown_i due to magnitudes of fringe due to stoppage of load facilities or increase in the solar photovoltaic output during period t, Mdown_E_σ is set to a larger value (e.g., 1.2). For this purpose, a comparison table among σ_σdown (t), the count, and Mdown_E_σ may be created. In this way, during computational processing where a comparison table is previously prepared and mathematical formula 5 is judged, information about Mdown_E_σ may be extracted from the comparison table and computational processing may be carried out. According to this method, when the comparison table is created, the value of Mdown_E_σ for securing an amount of output which can be reduced and which is necessary to avoid faults disturbing the system voltage can be previously optimized by a test environment or a computer simulation.

The set J of panel numbers of the solar photovoltaic panels interconnected to the microgrid is reduced until mathematical formula 5 is satisfied (obviously, if the solar photovoltaic panels are installed under the same conditions, the number of the solar photovoltaic panels is in proportion to ΔPVup (t)).

The processing from the above-described blocks 401 to 403 is again performed according to the determined set J of numbers of the solar photovoltaic panels interconnected to the microgrid.

The DEG machine selecting portion 404 selects DEGs which satisfy the DEG activation amount determined as described above with a priority on DEGs having good fuel efficiency. Preferably, selection of DEG machines continues in preparation for a fault of one DEG (N−1 accident) until an output equivalent to Pdeg (t) appears if that of selected DEGs which has the greatest rated output is stopped by an accident. Furthermore, preferably, DEG fuel efficiency refers to the fuel consumption in a central load region. That is, R of mathematical formula 6 is found as a rough number of a load factor steadily applied to DEGs. (However, in a case where a method of running extra DEGs in preparation for N−1 accident is also used, Pdeg (t) of mathematical formula 6 is replaced by a value obtained by adding the rated output of the DEGs operated unnecessarily to the value of Pdeg (t) determined in mathematical formula 4).

$$R=(D(t)-PV(t))/P\deg(t) \quad \text{(mathematical formula 6)}$$

Calculations are performed based on the fuel consumptions (liters/hour) of the DEGs which are run at a load factor of this R (output at a ratio of R of the rated output, kW, intrinsic to each DEG) and on the fuel consumption characteristic formulas intrinsic to the DEGs set forth in the facility profiles 408. DEG machines are selected in turn first from the DEG machines having smaller calculated values (preferable DEG machines having small fuel consumptions). That is, DEG machines are selected in turn until the total of the rated outputs of the selected DEG machines exceeds the above-described Pdeg (t). Consequently, where a large number of DEGs are activated in preparation for decreases in the solar photovoltaic output and operation is performed at small values of R (e.g., equal to or less than 50% of the rated output), the effective fuel consumption of the whole set of DEGs is improved.

Instead of the present embodiment, DEG machines may be selected in turn first from the DEG having the best fuel consumption at the rated output of DEG. This is an effective method in a case where fuel consumption characteristics at partially loaded output of DEGs are not known.

Where R is thereby made smaller than a given threshold value (e.g., 0.3 or less), processing from the block 401 may be again performed in such a way that the number of solar photovoltaic panels interconnected to the microgrid is reduced (J is reduced) so as to increase the value of R. According to this method, in a case where R is small, i.e., where DEGs operate at low output for a long time, it is possible to avoid increases in black smoke components (combustion residues of the fuel) of exhaust gas produced by incomplete combustion phenomenon of fuel within DEGs caused by combustion drop within the DEG cylinders.

Especially preferably, a given threshold value may be set for R at each magnitude of Pdeg (t). (For example, when Pdeg (t) is less than 1000 kW, the threshold value is set to 0.3. When Pdeg (t) is equal to or higher than 1000 kW, the threshold value is set to 0.4.) In this way, when the DEG machine type which is anticipated to operate in practice is varied by the size of Pdeg (t), black smoke components can be suppressed according to the characteristics regarding incomplete combustion of DEGs which are anticipated to operate.

Furthermore, a correction may be made such that a DEG once activated is continually activated with a priority even in the next period of consideration. Thus, the number of stops of activation of DEGs is reduced. This produces the effect that fuel needed for warm-up of the DEGs is reduced.

If DEG machines are selected as described above, such conspicuous effects are produced that it is possible to make preparations for large drops of PV outputs and an (N−1) accident (an accident where one of electric power facilities to be controlled fails to function) and that combustion of the DEGs can be maintained well, as compared with machine selection employing a conventionally adopted priority method (unit commitment) in which power generators are activated with a priority on a machine having a better output fuel consumption μ.

The solar photovoltaic generation interconnection distributing portion 405 determines intervals in which the interconnected breakers for solar photovoltaic generation are opened according to the set J of the numbers of the solar photovoltaic panels interconnected to the microgrid such that the required amount of interconnections is achieved. Thus, even if DEG outputs are made zero, increases of AC frequency of the microgrid or abnormal voltage increase which would be caused by the fact that supply of electric power exceeds can be suppressed.

The block of the economical load distribution 207 consists of DEG economical load distributing portions 406 which are operated parallel in an interconnected relation to the microgrid system and which determine economical output burden shares from the respective fuel consumption characteristics of the DEGs determined by the power supply activating and stopping plan 206.

In the present embodiment, economical output burden shares of DEGs are determined as economical load burden shares by an equal increment fuel consumption method (equal λ method). Here, regarding the i-th DEG machine, the lambda value is given by mathematical formula 7.

$$\lambda\_i = dFc(i)/dW(i), \quad \text{(mathematical formula 7)}$$

where i is a number given to the DEG machine, Fc (i) is the fuel consumption characteristic ((liters/hour)/kW) of the i-th DEG machine, and W (i) is the output from the i-th DEG machine.

According to an equal increment fuel consumption method (equal λ method), a set I of DEG machine numbers in operation satisfies mathematical formula 8.

$$\lambda\_i = \lambda\_j \text{ with respect to arbitrary } i,j \in I \quad \text{(mathematical formula 8)}$$

The supply and demand balance of the system in the planned period can be maintained by making the total of the outputs from the DEGs satisfy mathematical formula 9.

$$Pdeg(t) = \sum_{i \in I} W(i) \quad \text{(mathematical formula 9)}$$

DEGs satisfying the above-described mathematical formulas 8 and 9 are run. Set values of frequency droop for the DEGs, respectively, are calculated. The calculated values are transmitted to the governors of the DEGs via the remote controllers 71-75. The governors of the DEGs update the set values of frequency droop to the received values.

The block of the facility characteristics identification 208 offers facility profile information necessary for the blocks of power supply activating and stopping plan 206, economical load distribution 207, and operation simulation 209. The facility profiles are information about the output characteristics of the power supply facilities, output variability, responsiveness, fuel consumption characteristics, fuel increment characteristics, fringe characteristics (frequency at which operation of the load facilities is stopped, rated input, frequency at which incident solar radiation associated with solar photovoltaic generation varies, magnitude), time range characteristics of environment-friendly operation, load characteristics of environment-friendly operation, and so on. The block of the facility characteristics identification 208 consists of the facility profile management portion 408 for holding and outputting facility profile data and a facility profile learning portion 409 for learning profile information about facilities on an on-line basis from on-line formation including information about operation of the electric power facilities interconnected to the microgrid, the frequency of the microgrid, and information about the voltage and electric power of the electric power facilities. With respect to the on-line learning, the data contents are serially updated from data about the operation of the microgrid by a learning technique such as system identification approach, error back propagation method, or delta rule.

The block of the operation simulation 209 consists of a stability simulation portion 410 for making prior assessments of the transient stability and steady-state stability of the configurations of power supplies that are parallel to the microgrid determined by the block of the power supply activating and stopping planning portion 206, an environment assessment simulation portion 412 for making a prior assessment of the state of exhaust gas from the DEGs, and an operation check and indicating portion 411 for displaying the results of the stability simulations and the results of the environment assessment simulation on input-output means and obtaining a confirmatory input from a human operator.

Where a user confirming the stability gives an instruction to modify the contents of the plan of the power supply activation and stopping planning portion through the operation check and indicating portion 411, an instruction is given to the block of the power supply activating and stopping plan 206. The probabilistic optimum power supply activation amount planning portion 403 again modifies the determination such that the amount by which DEGs are activated is increased or the amount of interconnection of solar photovoltaic generation is reduced.

Furthermore, where a user checking the environment assessment gives an instruction to modify the contents of the plan of the power supply activating and stopping planning portion through the operation check and indicating portion 411, an instruction is given to the block of the power supply activating and stopping plan 206. The probabilistic optimum power supply activation amount planning portion 403 again modifies either the amount by which the DEGs are activated or the determined amount of interconnection of the solar photovoltaic generation.

In a preferred embodiment, in a case where the exhaust gas from the DEGs worsens, e.g., when fuel combustion temperature of the DEGs drops and an instruction is given to mitigate continuous operation at low load that will cause generation of black smoke due to combustion residues of the fuel, the probabilistic optimum power supply activation amount planning portion 403 makes a modification such that the amount of interconnection of the amount of solar photovoltaic generation is reduced. This increases the load factor of the DEGs and raises the fuel combustion temperature, thus reducing exhaust gas black smoke. Furthermore, as an example, if an instruction is given to mitigate rapid variations of the DEG output, the probabilistic optimum power supply activation amount planning portion 403 again determines such that the amount of interconnection of solar photovoltaic generation causing variations is modified. In addition, for example, if an instruction is given to mitigate the danger of instantaneously overloaded operation of DEGs, the probabilistic optimum power supply activation amount planning portion 403 again determines such that the number of interconnected DEGs is increased.

FIG. 6 shows facility profiles while taking the DEG 21 as an example. The file profiles set forth fundamental information (such as facility type (deviceType="DEG"), manufacturer (manufacturerType="manufacturer name"), model model name (model="DEG1000kVA400V"), and version (version="1.0")) and information about a list of electrical properties (such as characteristics connected with a system and constituting an electrical circuit and individual electrical characteristics). The electrical characteristics set forth information about a name space (<Naming.name> name dictionary of embodiment 1) in which names on a hardware configuration of FIG. 1 are indicated (Genset rdf: ID="DEG21") and ways of calling of constituent elements associated with the hardware configuration are available to show the circuit configuration, connected main electric power equipment (Equipment.MemberOf_EquipmentContainer rdf: resource="transformer 141 secondary side"), its reference voltage (VoltageLevel.BaseVoltage>400), and other equipment information, information about a location where the subject is electrically disposed (cim: Location rdf: ID=Location.PowerSystemResource rdf: resource="secondary side wires of transformer 141" of "configuration diagram 1", information about a method of determining geographical coordinate axes (such as X and Y coordinates of latitude and longitude) (GmlPosition rdf: ID="CP1005">), and information about locations such as coordinate positions (GmlPosition. X coordinate>187635. GmlPosition. Y coordinate 772863), rated output (1000 kVA) of the equipment that indicates electrical and mechanical characteristics, maximum output (1100 kVA), minimum output 100 kVA, a fuel function (Fuel consumption function, F (x)=0.0001 x*x+0.01x+10) indicating a fuel amount [liters/hour] consumed when the output is x [kW], a fuel increment λ (0.0001*x+0.01) indicating a fuel amount [liters/hour] necessary for an output increment of x [kW], characteristics of constraints on environment-friendly operation associated with equipment operation (such as the characteristics of the output at the lower limit of long-term lightly loaded operation (400 kVA) and the characteristics of limit time (time for which long-term lightly loaded operation is possible; 120 min) in which the exhaust gas components start to deteriorate as a result of the long-term lightly loaded operation), especially dynamic electrical characteristics (such as information associated with responsiveness when the output varies (e.g., the order of a transfer function (order 1 of the response transfer function) indicating the responsiveness characteristics and a time constant (response time constant of 0.05)), and information regarding the capability of the equipment having a dead time (response dead time constant of 0.01).

The above-described dynamic electrical characteristics can be represented in terms of a transfer function. In addition, they may be set forth using a polynomial model such as ARMA or using data obtained by plotting response characteristics.

FIG. 7 is a diagram showing the hardware configuration of a power supply facility 21. In the present embodiment, the power supply facility is a diesel generator (DEG). The power supply equipment 21 comprises a diesel engine 701, a governor 702 that is an engine control portion, a power generator 703, and an automatic voltage regulator AVR (automatic voltage regulator) 704, and are connected with the remote controller 71. Under instructions from the remote controller 71, the governor 702 adjusts the amount of fuel ejected into the engine 701 to vary the output torque of the engine, thus controlling the rotational speed of the engine (frequency of the power generator).

Here, the remote controller 71 gives instructions on set values of frequency droop for the governors of the power generation facilities. The governor 702 provides droop control using the frequency droop.

Figure 8:
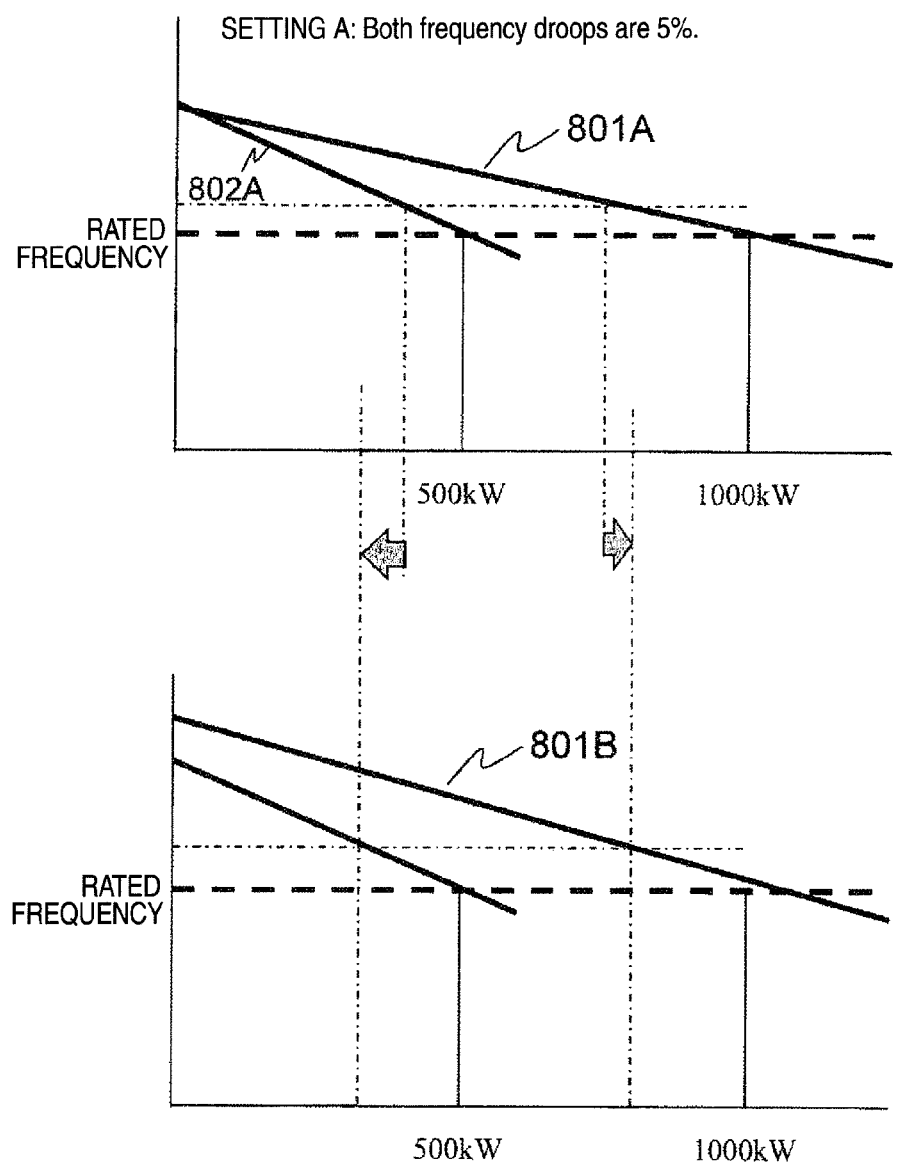
FIG. 8 is a diagram showing load distribution relying on frequency droop.

FIG. 8 is a diagram illustrating that DEG output allocations are adjusted by varying the settings of the DEG frequency droop. The frequency droop is set such that a rated output is provided at a rated frequency. The load is gradually reduced. The difference between a frequency occurring when no load is applied and the rated frequency is expressed in terms of percentage. 801A is a frequency/output characteristic line at a 5% frequency droop of the DEG 21 having a rated output of 1000 kW. 802A is a frequency/output characteristic line at a 5% frequency droop of the DEG 22 having a rated output of 500 kW. 801B is a frequency/output characteristic line obtained when an instruction is given to make the set value of the frequency droop of the DEG 21 equal to 7%. Consequently, the output allocations of the two DEGs vary as indicated by the arrows in the figure. Because of this principle, the microgrid control system can arbitrarily control each DEG output.

Figure 9:
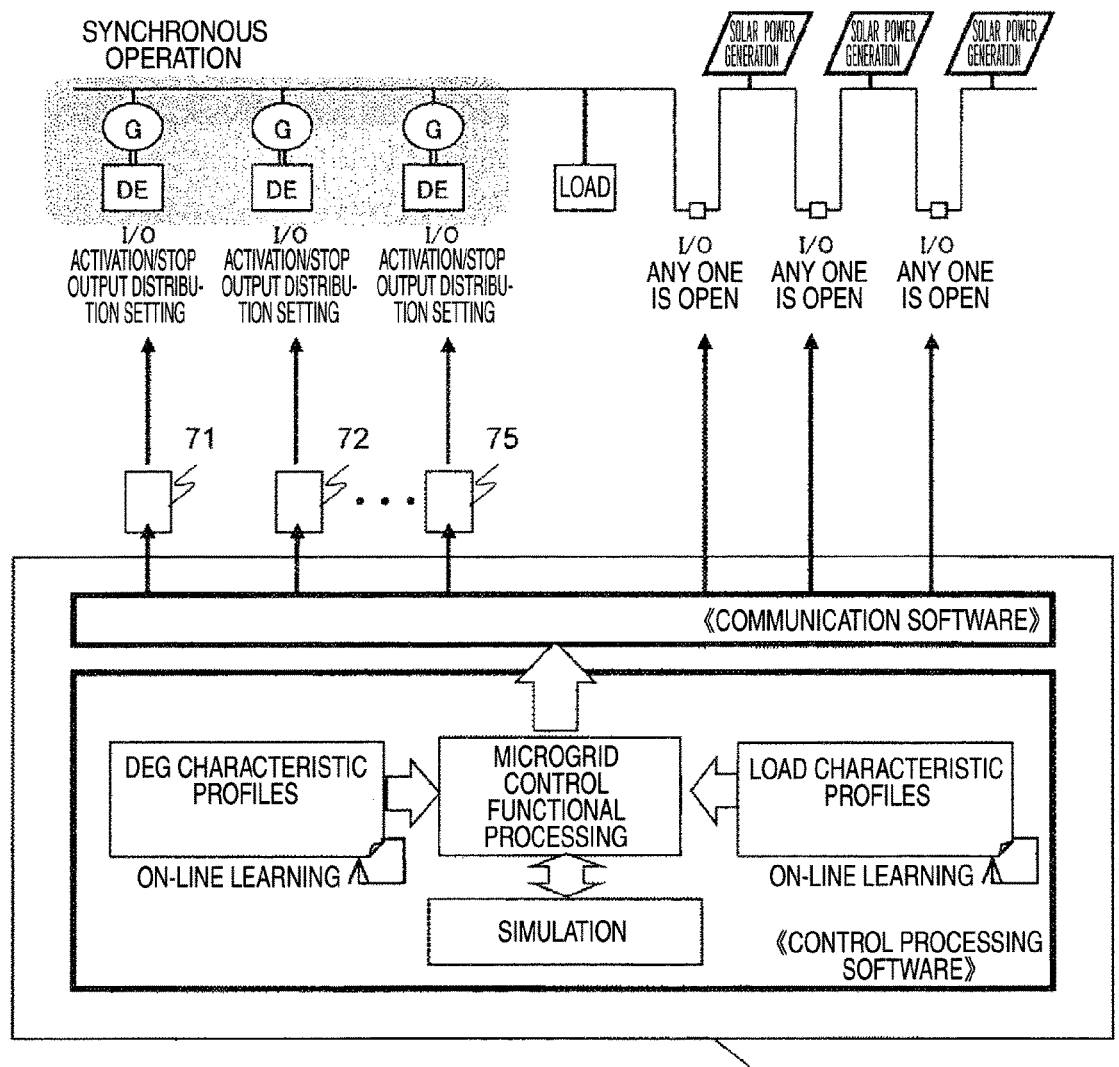
FIG. 9 is a diagram showing software configuration and facility I/Os.

FIG. 9 is a diagram illustrating the relation between the software configuration and facility I/Os of the microgrid control system. The power supply activating and stopping plan 206, economical load distribution 207, and facility characteristics identification 208 which are functional processings of the microgrid control select DEG machines (selected DEGs are run in parallel and synchronously) according to the information about the facility profiles indicative of the DEG characteristics and the facility information indicative of the characteristics of the load facilities and send and receive the values of frequency droop giving conditions under which the selected DEGs operate using communication software between the system controller and the remote controller. With respect to interconnection of the solar power generators with the microgrid, it is possible to control how many solar power generators are interconnected by an instruction given to breakers via an I/O.

Figure 10:
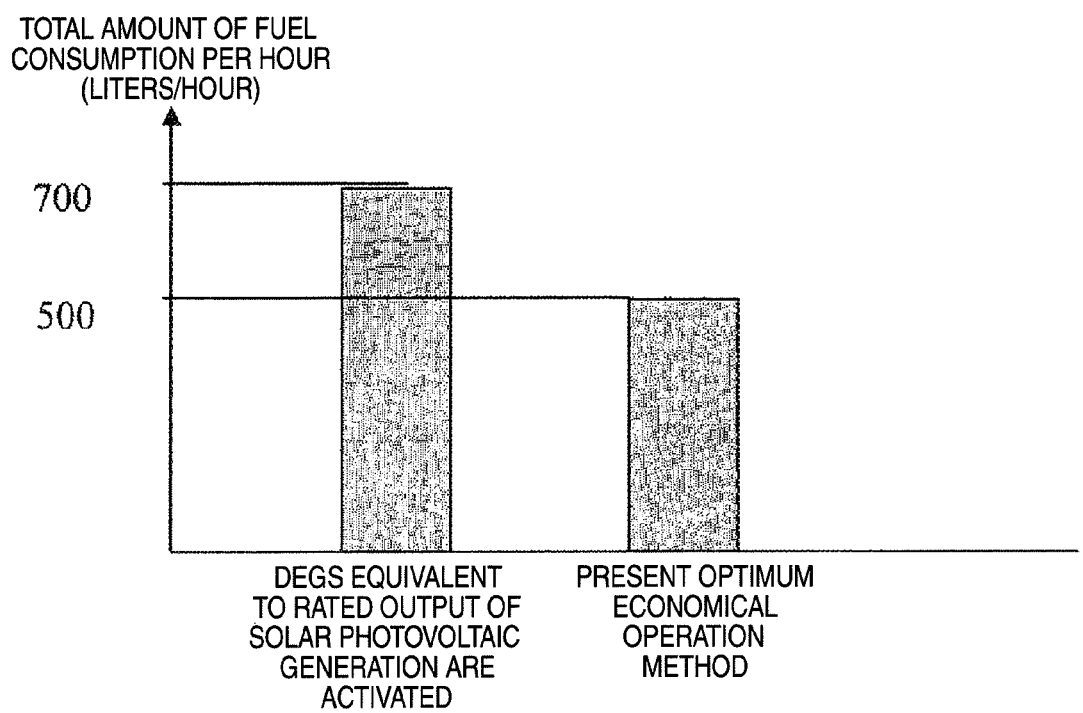
FIG. 10 is a diagram illustrating improvement of fuel consumption amount achieved in a case where the microgrid control of the present embodiment is provided.

FIG. 10 is a diagram illustrating the advantageous effects of the present embodiment. Where the microgrid is controlled by the present invention, excessive DEG activation can be suppressed by appropriately forecasting predictive errors in variations in solar photovoltaic output and load variations. Consequently, the fuel amount per unit time required by each DEG can be reduced.

Furthermore, the present embodiment makes it possible to prevent deterioration of DEG exhaust gas components due to long-term, lightly loaded operation and generation of blackout due to shortage of the DEG output.

Figure 11:
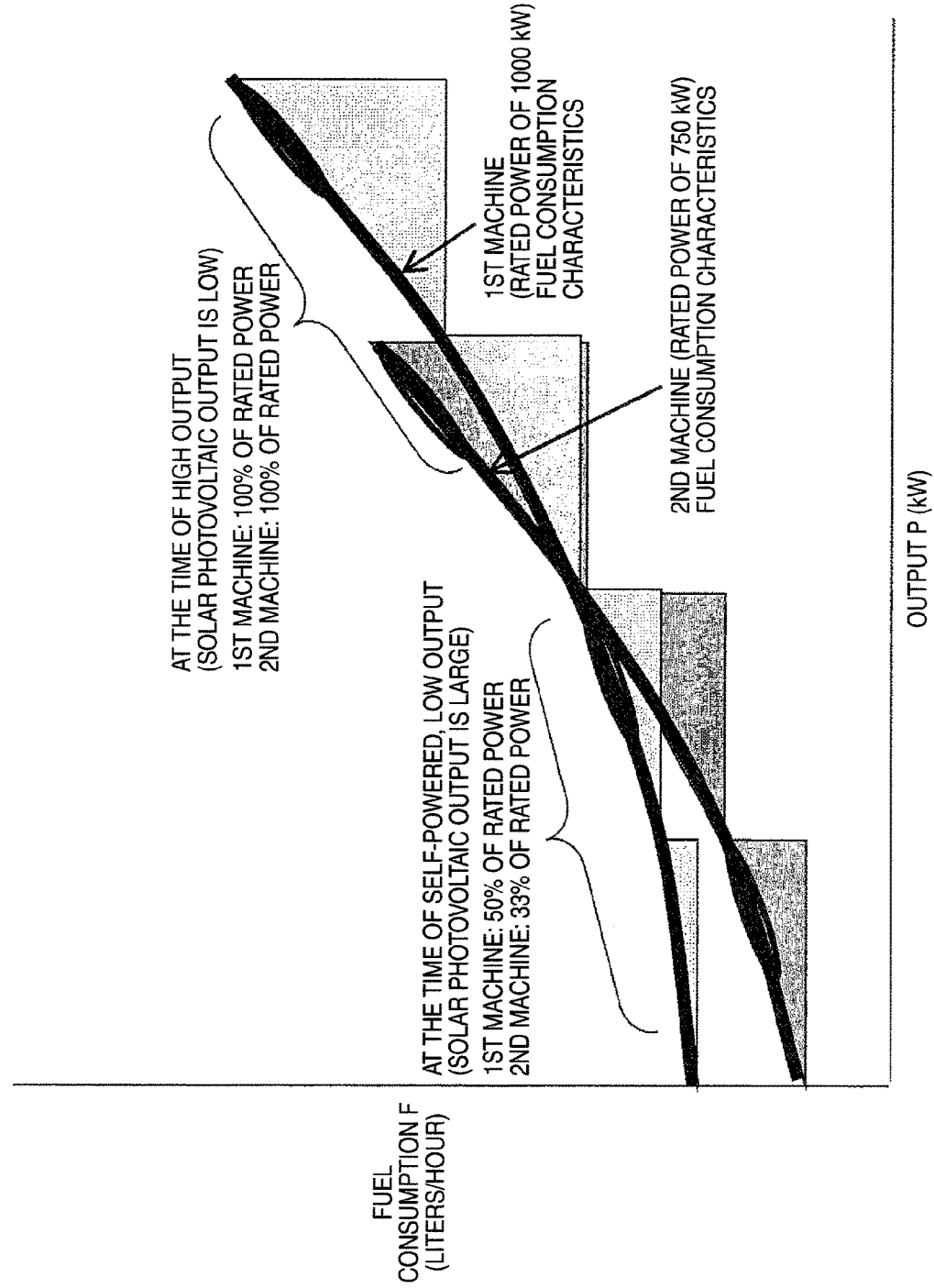
FIG. 11 is a diagram showing variations of output distribution of DEGs.

FIG. 11 is a diagram showing variations in the DEG output allotments when the present embodiment is implemented. Here, during some period of consideration, first and second DEG machines are in operation and the output is distributed between the two DEG machines. The first machine has a rated output of 1000 kW. The second machine has a rated output of 750 kW. (Here, when the first machine is higher in load factor than the second machine, a better fuel consumption is obtained). According to the embodiment of the present invention, the outputs of the first and second machines are allotted according to λ shown in mathematical formula 7. Under high load conditions (total output of 1750 kW), both machines are operated in their rated output. In lightly loaded regions, the first machine provides a higher output than the second machine.

REFERENCE SIGNS LIST 1-5 plants
6 microgrid system
9 system controller
7 external electric power system
11-17 shared power supply facilities
205 storage device
206 program for realizing functions of power supply activating and stopping plan
207 program for realizing the functions of economical load distribution
208 program for realizing the functions of facility characteristics identification
209 program for realizing the functions of operation simulation
210 program for realizing the functions of sending and reception of remote control information

The invention claimed is:

1. A microgrid control system for controlling operations of a plurality of electric power facilities, comprising:
   a power supply machine activating and stopping planning portion; and
   an economical load distributing portion that determines command values associated with allocations of a load to a plurality of electric power supply facilities, wherein electric power equipment comprising at least solar panels are equipped at each of the plurality of electric power supply facilities;
   wherein the power supply machine activating and stopping planning portion:
   forecasts output amounts of the plurality of electric power supply facilities and amounts of load on a plurality of electric load facilities, and
   forecasts errors for the output amounts forecasted and the amounts of load forecasted,
   determines a total amount of output for power supply facilities to be activated, based on the output amounts forecasted, the amounts of load forecasted and the errors forecasted, and
   selects power supply facilities to be activated, based on the total amount of output determined and on characteristic information about the power supply facilities such that power supply facilities having good fuel consumption characteristics are selected in turn until a total of rated outputs of the power supply facilities selected exceeds a predetermined value,
   calculates load factors based on load ratios of the power supply facilities, and
   limits outputs from the solar panels of the power supply facilities when the load factors calculated are below a given threshold value, wherein limiting outputs from the solar panels increases the load factor for each of the plurality of power supply facilities; and
   wherein the characteristic information about the power supply facilities includes information about fuel consumption characteristics of the power supply facilities, wherein the information about fuel consumption characteristics includes fuel consumption characteristics in a load region about which a particular power supply facilities operates.

2. The microgrid control system set forth in claim 1, wherein the power supply machine activating and stopping planning portion further selects power supply facilities with a priority on power supply facilities currently in operation.

3. The microgrid control system set forth in claim 1, further comprising a facility characteristic identification portion for learning profile information regarding one or more of characteristic of variability, responsiveness, fuel consumption, incremental amount of fuel consumption, environmental load characteristics, and environment-friendly operation time range characteristics regarding outputs from the power supply facilities or loads on the load facilities.

4. A microgrid control method for controlling operations of a plurality of electric power facilities, comprising:
   forecasting amounts of output of a plurality of electric power supply facilities and amounts of loads on a plurality of electric load facilities, wherein electric power equipment comprising at least solar panels are equipped at each of the plurality of electric power supply facilities;
   forecasting errors of the amounts of output forecasted and the amounts of loads forecasted;
   determining a total amount of output of power supply facilities to be activated, based on the output amounts forecasted, the amounts of loads forecasted and the errors forecasted;
   selecting power supply facilities to be activated, based on the total amount of output determined and on characteristic information about the power supply facilities such that power supply facilities having good fuel consumption characteristics are selected in turn until a total of rated outputs of the power supply facilities selected exceeds a predetermined value;
   calculating load factors based on load ratios of the power supply facilities; and
   limiting outputs from solar panels of the power supply facilities when the load factors are below a given threshold value, wherein limiting outputs from the solar panels increases the load factor for each of the plurality of Power supply facilities; and
   wherein the characteristic information about the power supply facilities includes information about fuel consumption characteristics of the power supply facilities, wherein the information about fuel consumption characteristics includes fuel consumption characteristics in a load region about which a particular power supply facilities operates.

5. The microgrid control method set forth in claim 4, wherein the selecting is further based on a priority on power supply facilities currently in operation.

* * * * *